United States Patent [19]
Chang et al.

[11] 3,986,775
[45] Oct. 19, 1976

[54] REMOTE MEASUREMENT OF FLUID TEMPERATURE BY RAMAN SCATTERED RADIATION

[75] Inventors: Chin H. Chang, Edison, N.J.; Lee A. Young, Lincoln; Donald A. Leonard, Stoneham, both of Mass.

[73] Assignee: The United States of America as represented by the Secretary of the Navy, Washington, D.C.

[22] Filed: Dec. 26, 1974

[21] Appl. No.: 536,531

[52] U.S. Cl. .................................. 356/75; 356/45
[51] Int. Cl.² ........................ G01J 5/44; G01J 5/60
[58] Field of Search ............. 356/45, 75; 250/339; 73/355 R, 355 EM

[56] References Cited
UNITED STATES PATENTS

| | | | |
|---|---|---|---|
| 2,237,713 | 4/1941 | Russell | 356/45 |
| 3,723,007 | 3/1973 | Leonard | 356/75 |

OTHER PUBLICATIONS

Worley et al., "Near-Infrared Spectra of $H_2O$–$D_2O$ Solutions" Jour. of Chemical Physics, vol. 45, 10-66, pp. 2868-2871.
Walrafen, G. E. "Raman Spectral Studies of the Effects of Temperature On Water and Electrolyte Solutions," Jour. of Chem. Physics, vol. 44, 2-66, pp. 1546-1558.
Richards et al., "Additivity of Raman Spectra of Dioxane-Benzene Mixtures," Analytical Chem. vol. 21, 9-49, pp. 1035-1037.
Widhopf et al., "Specie Concentration Measurements Utilizing Raman Scattering of a Laser Beam," AIAA Jour., vol. 9, 2-1971, pp. 309-316.
Walrafen, G. E. "Raman Spectral Studies of the Effects of Temperature on Water Structure" Jour. of Chem. Physics, vol. 47, 7-1967, pp. 114-126.
Walrafen G. E. "Raman Spectral Studies of Water Structure" Jour. of Chem Physics, vol. 40, 6-1964, pp. 3249-3256.

*Primary Examiner*—John K. Corbin
*Assistant Examiner*—Wm. H. Punter
*Attorney, Agent, or Firm*—R. S. Sciascia; Henry Hansen

[57] ABSTRACT

The remote temperature measurement of a fluid is determined by Raman backscattered radiation from the fluid where the fluid is subjected to intense pulses of laser radiation generated at a remote location. The backscattered radiation is filtered to selectively attenuate reflected radiation from the laser and is transmitted to a detector system which individually counts the detected radiation in each of two different radiated frequencies. A divider generates a ratio of the count which is transformed by a function generator to produce an output signal indicative of fluid temperature.

12 Claims, 4 Drawing Figures

REMOTE MEASUREMENT OF FLUID TEMPERATURE BY RAMAN SCATTERED RADIATION

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to the remote measurement of fluid temperature and particularly to a temperature measurement system which operates by analysis of backscattered Raman radiation.

Water, having high heat capacity and being the most abundant compound on the surface of the earth, has been used extensively as a coolant and heat exchange fluid in various kinds of experimental and practical equipment. For example, in nuclear reactors it is desirable to operate at the highest practicable temperature owing to the fact that at higher temperatures the efficiency for conversion into useful power is greater. Since an increase in temperature decreases the density of water and therefore the cooling efficiency, pressure is usually applied to the cooling system. Under extreme conditions of high pressure and high temperature, the temperature of water is normally measured by thermocouples or, in the case of a nuclear reactor, a boron thermopile. Inserting a thermocouple into the point of interest has the effect of interfering with the flow pattern of the water and, correspondingly, with the local temperature. Another limitation in the nuclear reactor situation is that the temperature is only indirectly measured by the density of neutron flux. Both thermocouples and thermopiles are permanently engineered into the reactor system and any replacement or redesigning is not easily undertaken especially in a high pressure system.

SUMMARY OF THE INVENTION

Accordingly, it is an object of the present invention to provide a system that accurately measures at a remote location the temperature of a relatively small area within a fluid. Another object of the invention is to provide temperature measurement of a fluid through the analysis of backscattered Raman radiation. Yet another object of the present invention is to provide for remote temperature measurement at various points within the fluid. Still one other object of the invention is to provide for remote temperature measurement of a fluid by a device which is noncomplex in its nature and which can be used to determine fluid temperature in a relatively minimum amount of time.

Briefly, these and other objects are accomplished by a pulse laser which is tuned and focused at some point within the fluid. Backscattered Raman radiation from the point is reflected by a mirror through a focusing lens to a filter designed to screen out the tuned laser frequency and to pass only the backscattered Raman radiation frequencies. The optical output from the filter is divided by a beamsplitter and mirror combination which respectively provides outputs to corresponding interference filters each of which is tuned to a discrete predetermined Raman wavelength. Individual detectors sense the respective outputs of the Raman wavelength filters which are individually amplified and connected to the inputs of respective pulse train encoders whose output signal lengths are proportional to the amplitude of the signals from each of the detectors. Individual counters respectively count the number of pulses from the respective encoder outputs and the counts are connected to the input of a divider which provides a quotient output to a function generator whose output causes an indicator to show the measured temperature. A delay pulse generator receives an input pulse synchronized in time with the output pulse of the laser and produces a variable delay output pulse to each of the respective encoders so that the effect of dark current noise from the detectors is minimized and also to allow the measuring system to range over a variety of measuring points.

For a better understanding of these and other aspects of the invention, reference may be made to the following detailed description taken in conjunction with the accompanying drawings.

DESCRIPTION OF THE PREFERRED EMBODIMENT

Figure 1:
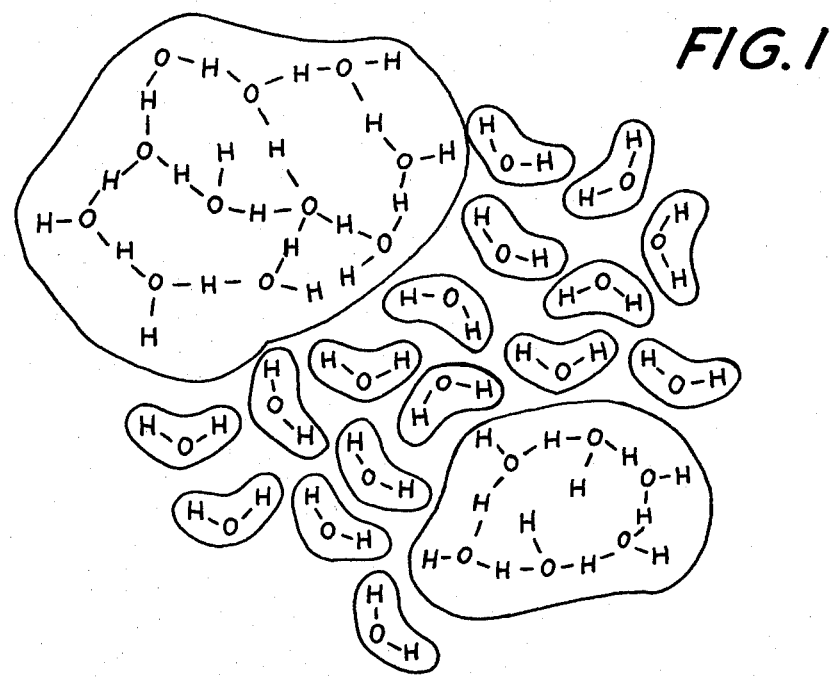
FIG. 1 is a model of the structure of water as acted upon by the present invention.

Referring now to FIG. 1, there is shown a model molecule H—O—H, and a hydrogen bonded polymer the structure of a fluid such as, for example, water as a mixture of clusters and single molecules. Other fluids such as hydrogen fluoride, which may be either a gas or liquid depending upon pressure and temperature, and certain bio organic molecules also exhibit a similar mixture model. This model assumes the simultaneous existence of at least two distinguishable species of water. Earlier sound absorption measurements and many infrared, near infrared, and Raman spectroscopic investigations support this mixture model. In the simplest version of this model of liquid water, a kinetic equilibrium exists between two structurally distinct species, a non-hydrogen-bonded monomer shown as the smaller encircled molcule H—O—H, and a hydrogen bonded polymer illustrated as the larger encircled cluster comprising a multitude of hydrogen and oxygen elements. Since the water molecule cluster has a large dipole moment and the monomer has a more compact structure than that of the cluster, the population ratio of these two structural states is controlled by the pressure of the water, the concentration of charged ions in the water, and the temperature of the water.

Figures 2, 3:
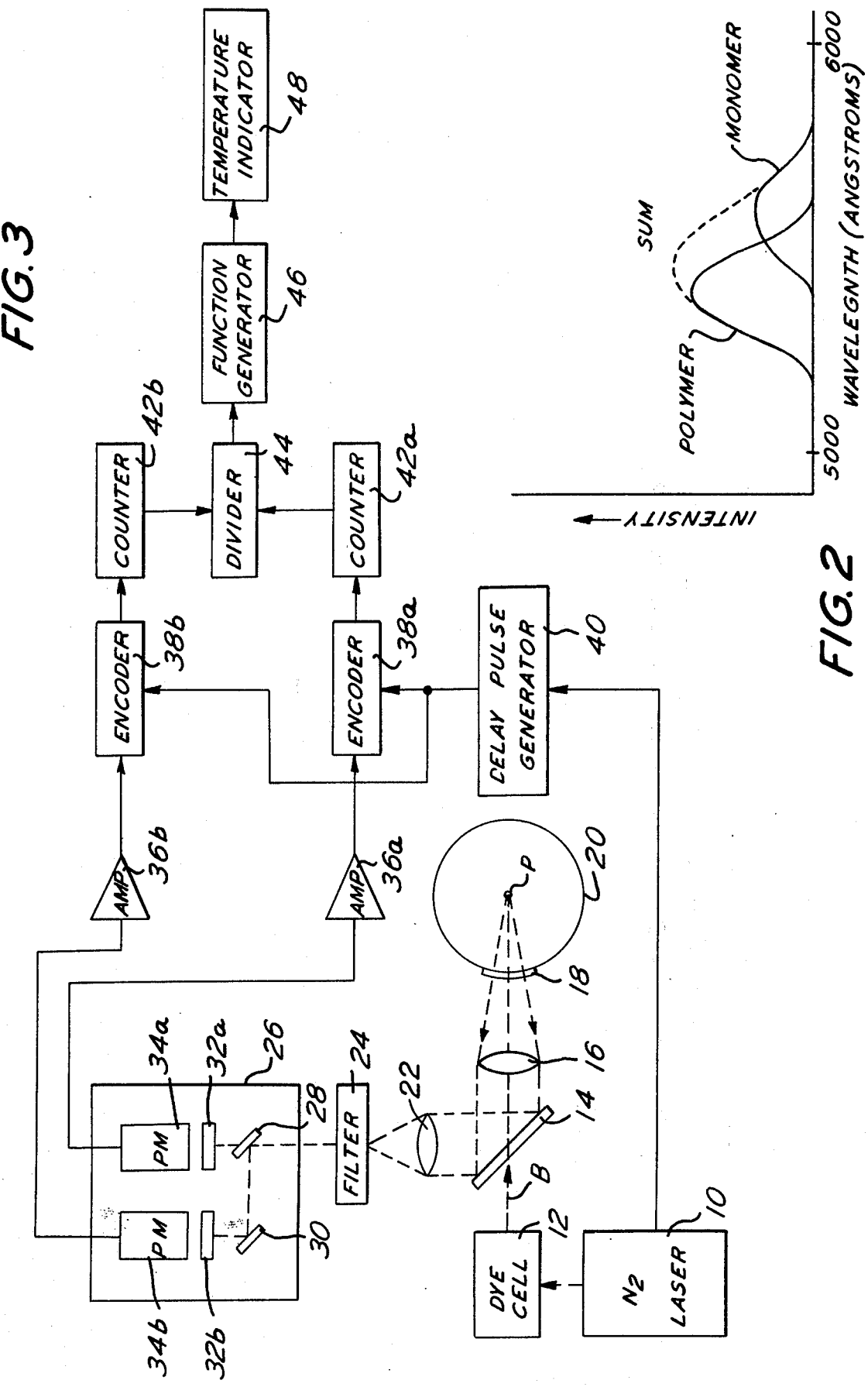
FIG. 2 is a graph in wavelength vs. intensity of the Raman spectrum of the fluid model shown in FIG. 1.
FIG. 3 is a block diagram of the present invention.

Referring now to FIG. 2, there is shown a graph of the Raman spectrum of liquid water plotted in wavelength vs. intensity. As noted, the two continuous curves respectively represent the Raman spectrum of the polymeric and monomeric species of liquid water with the polymeric species producing a more pronounced effect at the low wavelength end of the Raman spectrum and the monomeric species producing a pronounced effect at the high wavelength end. The sum of the polymer and monomer curves are illustrated in the discontinuous line shown in the graph. As earlier noted, there exists a temperature dependence within the Raman spectra of liquid water. This dependence causes a minor but detectable shifting effect within the Raman spectra. Accordingly, as the temperature of the liquid water is raised, the curves shown in FIG. 2 have a tendency to shift to the right thereby incurring an increase in wavelength and a corresponding decrease in intensity. Conversely, should the temperature of the liquid water be lowered, the curves shown in FIG. 2 have a tendency to shift to shorter wavelengths and a corresponding increase in intensity. This phenomenom is discussed in further detail by G. E. Walrafen, Journal of Chemical Physics, Volume 47, 1967. It should be noted that there are two isosbestic points (not shown) situated at each side of the point of maximum intensity that is shown in the sum curve of the Raman spectra. The respective isosbestic points represent wavelengths between which the curves are independent of temperature variation and, accordingly, no shifting occurs. Thus the temperature information of the Raman spectra is obtained from the shift of the relative intensities of the spectra contours that lead away from the isosbestic wavelengths. By comparing the relative spectral intensities in the two halves of the Raman band affected respectively by the polymeric and monomeric mixture of the liquid water, the temperature of the water can be calculated. The comparison of two relative spectral intensities of differing Raman shifted wavelengths also provides a cancellation effect to minimize any incremental change in spectral intensity by the laser or other structural elements within the measuring system.

Referring now to FIG. 3, there is shown a block diagram of the present invention. A nitrogen laser 10 produces coherent light pulses which sequentially pass through a dye cell 12, a hole in the center of a mirror 14, a first focusing lens 16 and an optically transparent window 18 attached to a cross-section 20 of a container of fluid such as water. The plane of the mirror 14 is optically aligned at a 45° angle with the axis of the laser beam B and a second focusing lens 22 is optically aligned at a 45° angle with the plane of the mirror 12 and at right angles to the axis of the laser beam. The lens 22 focuses incoming radiation onto a filter 24 which passes filtered radiation to a radiation detector network 26. Network 26 comprises a beamsplitter 28 which receives the filtered radiation from filter 24 and splits the radiation into two components, one of which is reflected onto a reflecting mirror 30 positioned at a 45° angle to the incoming beam and the other component of which is transmitted to a first Raman wavelength filter 32a. Mirror 30 reflects the incoming beam onto a second Raman wavelength filter 32b. Dual photomultiplier (PM) tubes 34a, 34b, receive respectively optical outputs from filters 32a, 32b and provide corresponding electrical outputs from the network 26. Charge sensitive amplifiers 36a, 36b are connected to receive respective outputs from the photomultipliers 34a, 34b and provide amplified outputs respectively to first inputs of encoders 38a, 38b. A delay pulse generator 40 is connected to receive a trigger pulse from the laser 10 and provides an output signal that is commonly connected to second inputs of the encoders 38a, 38b which provide corresponding outputs to counters 42a, 42b. A divider 44 is connected to receive respective outputs of the counters 42a, 42b and produces a quotient output which is connected to the input of a function generator 46 whose output is connected to a temperature indicator 48.

Again referring to FIG. 3 the operation of the invention will now be described. For the sake of simplicity and ease of illustrating the present invention, specific operating parameters will be assigned to particular structural elements within the invention and are offered by way of example only inasmuch as the present invention is not to be restricted to these exemplary operating parameters. Although other lasers may be used, the laser in the embodiment of the present invention is a 3371A ultraviolet pulsed nitrogen laser. The laser 10 output is received by the dye cell 12 which tunes the 3,371A beam to a 4600A beam. At 4600A, the water in the container cross-section 20 appears more transparent to the laser beam than at 3,371A. The output beam of the dye cell 12 is passed through the hole in the mirror 14 and focused by the lens 16 through the window 18 of the water container cross-section 20 onto a point P in the center of the cross-section. The focal point of the lens 16 and other gating circuitry which will later be explained determines the point P within the container cross-section 20 at which the temperature is to be measured. Upon focusing at the measurement point P within the water, there is a Raman backscattering radiation effect covering wavelengths over a spectra of approximately 5270A to 5600A as earlier illustrated in FIG. 2. Correspondingly, the bandwidth of the Raman water spectra is approximately 50 to 100 angstroms. The backscattered radiation is collected and focused by lens 16 upon the surface of the mirror 14 which is positioned at a 45° angle to the laser beam B. Consequently, the mirror 14 causes the focused backscattered radiation to be transmitted at a 90° angle to the laser beam and to be further focused by the second lens 22 which directs the backscattered radiation into the filter 24. Filter 24 blocks the remainder of the 4600A radiation reflected back from the water but passes the Raman shifted rediation characteristic of the temperature measurement point within the water. The filter 24 may be disposed substantially anywhere within the reflected radiation optical path. One suitable filter for this purpose is a liquid filter which exhibits essentially complete isotropic volume bulk absorption of 4600A radiation but is nearly completely transparent to longer wavelengths. The purpose of the filter is to block the 4600A radiation from the dye cell which is reflected from the target point P and which the Raman wavelength filters 32a, 32b, may not be able to reject fully. The optical output from filter 24 is transmitted to the input of the beamsplitter 28 which splits the filtered output between a first component which is transmitted to a reflecting mirror 30 and a second component which is transmitted to the first Raman wavelength filter 32a. This first Raman wavelength filter is designed to pass a predetermined wavelength, for example, of 5390A. This wavelength and the succeeding wavelength to be used in the second Raman filter 32b is predetermined by laboratory calibration to pass only the Raman shifted wavelength which provides maximum sensitivity to temperature changes within the water body under measurement. The predetermined filter wavelengths are interrelated and are indicative of Raman induced shifts caused by the dual species of the water molecules as earlier noted. Accordingly, one Raman filter operates at a wavelength within the monomer-induced portion of the Raman spectra and the other filter operates at a wavelength within the polymerinduced portion of the Raman spectra. The filters 32a, 32b have a band-width, for example, of 50 angstroms in order to detect intensity changes over a relatively large spectrum of the monomeric and polymeric species. Reflecting mirror 30 reflects the incoming optical beam to the second Raman filter 32b tuned to a wavelength, for example, of 5490A. The output from filter 32a is focused on the field stop (not shown) of the first photomultiplier tube 34a and the output from filter 32b is focused on the field stop (not shown) of the second photomultiplier tube 34b. The photomultipliers 32 are sensitive to the photoelectrons contained within the filtered Raman wavelengths and provide an electrical output which is indicative of the intensities of the photoelectrons at the respective wavelengths. The output of photomultiplier 34a is connected to the input of a first charge sensitive amplifier 36a and the output of photomultiplier 34b is connected to the input of a second charge sensitive amplifier 36b. The respective amplified outputs from amplifier 34 are connected to first inputs of the encoders 38a, 38b. The pulse delay generator 40 is connected to receive the trigger pulse which indicates the occurrence of periodic light pulses from the laser 10 provides a series of corresponding output pulses delayed in time and which are commonly connected to the second or gating inputs of encoders 38a, 38b. The purposes of the delay generator 40, which will later be explained, is to minimize the dark current time produced by the photomultipliers 32 and to provide ranging capability. Encoders 38a, 38b are connected to receive the outputs from amplifiers 36 and respectively provide high frequency pulse trains having a frequency for example, of 40 Megahertz, whose lengths are proportional to the amplitude of the signal from the photomultipliers 34. Individual pulse trains are initiated by the respective encoders upon the receipt of each delay pulse at the gating inputs and continue to be produced for the duration of the individual delay pulses. Accordingly, a new delay pulse will signal the start of a new pulse train whose length is indicative of the signal amplitude to the respective encoder at that time.

The variable length pusle train outputs from each of the encoders 38b, 38b are respectively connected to individual inputs of the counters 42a, 42b which provide an output count indicative of the sum of pulses within all of the respective encoder pulse trains. Accordingly, the output from counter 42a provides a count indicative of the spectral intensity of the low wavelength end of the Raman spectra under observation and the count at the output of counter 42b provides an output count indicative of the spectral intensity at the high wavelength end of the Raman spectra under observation. Divider 44 has a first input connected to receive the output count from counter 42b and a second input connected to receive the output count from counter 42b and provides a quotient output representative of the division of the count provided at the second input divided by the count provided at the first input. Obviously, since the present invention processes a ratio or two spectral intensities, the divisor and dividend signal levels may be interchanged. The function generator 48 is connected to receive the quotient output from the divider 46 and generates an output signal only according to a predetermined function as further described hereinbelow.

Figure 4:
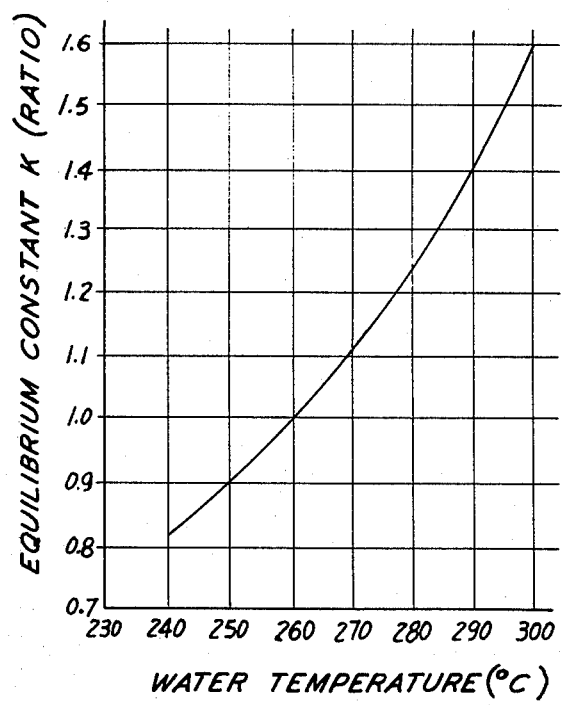
FIG. 4 graphically illustrates the response function of a typical function generator shown in FIG. 3.

Referring now to FIg. 4, a graph is illustrated in water temperature (°C.) vs. K (an equilibrium constant). The equilibrium constant K is that value equal to the quotient output of the divider 44 which is formed from the ratio of the two counter 42 outputs. In calibrating the graph for the constant K, it is assumed that the Raman cross-section is formed by equal contributions from each of the two species. More formally, however, the equilibrium constant $K$ is expressed as $K = [M]/[B]$ where $[M]$ and $[B]$ are mole fractions, respectively, of the non-hydrogen bonded monomer and the hydrogen-bonded polymer. Accordingly, the constant $K$ may be adjusted to reflect differing contributions from each species. In this example, the graph has been laboratory calibrated for equilibrium constants ranging from 0.7 to 1.6 and the corresponding water temperature ranges from 230° to 300°C. This exemplary graph depicts a temperature sensitive curve which is calibrated at a particular fixed pressure, for example, of 2500 psi and which minimizes the effects of salinity. The plotted curve is substantially linear especially over short temperature changes and indicates an increasing water temperature for an increasing equilibrium constant. Obviously, other functions for differing water temperatures, pressures and equilibrium constants may be plotted for use in the present invention.

Referring again to FIG. 3, the function generator 46 is calibrated to simulate the function shown in the exemplary curve of FIG. 4. Accordingly, the generator 48 produces an output in any convenient form such as a voltage level which is indicative of the water temperature under observation. The temperature indicator which may be, for example, a meter movement calibrated in degrees centigrade is connected to receive the output from the function generator and provides an accurate indication of the water temperature.

As earlier noted, the delay pulse generator 40 is utilized to minimize the dark current count generated by the photomultiplier tubes 34. A typical dark current counting rate is approximately 200 counts per second. However, when the second inputs of the encoders 38a, 38b are gated with, for example, 100 nanosecond gate pulses at the rate of 100 pulses per second the dark current count is less than $2 \times 10^{-3}$ per second. One example of such a gated encoder is a model 100/N manufactured by Ortek, Inc., Oak Ridge, Tenn. The foregoing example illustrates the significant reduction in dark current count that can be achieved by effectively gating the outputs of the photomultipliers so that the outputs represent only the Raman scattered radiation from the measurement point P. Such a gating effect also inherently provides ranging capability inasmuch as the encoders only receive the photomultiplier outputs during intervals which must relate to the laser pulse interval as a range interval. If the gate pulse interval produced at the output of a generator 40 is coincident with the laser pulse interval, the range is zero. Assuming, for example, that the container cross-section 20 has a radius of 20 meters and the beam distance from the laser to the point P is 10 meters, there would be required an approximate delay of 90 nanoseconds between the receipt of a trigger pulse from the laser and the output from the generator 40 for the measuring system to focus on point P. Of course, the delay time that is designed into the generator 40 could vary according to the optical range between the laser and the target point.

Thus it may be seen that there has been provided a novel temperature measuring system for remote measurements of fluid temperature without any interference to the flow patterns of the fluid under observation.

Obviously, many modifications and variations of the invention are possible in light of the above teachings. For example, a pulse counter may conveniently be connected to the trigger pulse from the output of the laser in order to count the number of pulses produced over a given period of time in order to provide a predetermined statistical precision for temperature measurement. It is therefore to be understood that within the scope of the appended claims the invention may be practiced otherwise than as specifically described.

What is claimed is:

1. A device for temperature measurement of a fluid having both monomeric and polymeric species, comprising, in combination:

radiation generating means for producing periodic pulses of monochromatic radiation of a predetermined wavelength directed into said fluid;

detection means for detecting Raman scattered radiation of a first wavelength indicative of the monomeric species and a second wavelength indicative of the polymeric species, said Raman radiation being scattered from said fluid due to the incident monochromatic radiation and for producing a first output signal having an amplitude indicative of the spectral intensity at said first wavelength and a second output signal having an amplitude indicative of the spectral intensity at said second wavelength;

ratio means connected to receive said first and second detection means output signals for providing an output signal representative of the ratio value thereof; and function generating means connected to receive said ratio means output signal for transforming the ratio value into an output signal indicative of the temperature in said fluid according to a predetermined function.

2. A device for temperature measurement according to claim 1 wherein said ratio means further comprises:

counting means connected to receive said first and second detection means output signals for providing first and second counts indicative of the respective amplitudes of each of said detection means output signals; and dividing means connected to receive said first and second counts for dividing said first count by said second count and for providing said ratio means output signal.

3. A device for temperature measurement according to claim 2 wherein said detection means further comprises:

radiation separation means for receiving and separating said Raman scattered radiation from said monochromatic radiation;

filter means for receiving said separated radiation for filtering respectively at said first wavelength indicative of the monomeric Raman spectral region of said fluid and at said second wavelength indicative of the polymeric Raman spectral region of said fluid and for producing outputs representative thereof; and photomultiplier means for receiving said filter means outputs for converting said filtered radiation into respective electrical signals to form said detection means first and second output signals.

4. A device for temperature measurement according to claim 3 wherein said counting means further comprises:

a first encoder connected to receive said detection means first output signal for producing a first pulse train having a length proportional to the amplitude of the first output signal;

a second encoder connected to receive said detection means second output signal for producing a second pulse train having a length proportional to the amplitude of the second output signal;

a first counter connected to receive the first pulse train for counting the number of pulses therein and for providing said first count; and a second counter connected to receive the second pulse tain for counting the number of pulses therein and for providing said second count.

5. A device for temperature measurement according to claim 4 wherein said radiation generating means further comprises:

a nitrogen laser for producing said monochromatic radiation at a third wavelength; and tuning means for receiving said monochromatic radiation and converting said radiation from said third wavelength to said predetermined wavelength.

6. A device for temperature measurement according to claim 5 wherein said tuning means comprising a dye cell.

7. A device for temperature measurement according to claim 6 further comprising:

said radiation generating means providing a trigger signal having a series of pulses indicative of the time occurrence of respective ones of said radiation pulses;

said first and second encoders each having a gate input for actuating said encoders upon the receipt of a pulse; and delay means connected to receive said trigger signal for producing a series of delayed output pulses commonly connected to said first and second encoder gate inputs whereby each delay pulse is differently spaced in time relative to a radiation pulse by an interval indicative of the range from said radiation generating means to said fluid.

8. A device for temperature measurement of a fluid having both monomeric and polymeric species, comprising in combination:

radiation generating means for producing periodic pulses of monochromatic radiation at a predetermined wavelength directed into said fluid and for providing a trigger signal having a series of pulses indicative of the time occurrence of respective ones of said radiation pulses;

detection means for detecting Raman scattered radiation of a first wavelength indicative of the monomeric species and a second wavelength indicative of the polymeric species, said Raman radiation being scattered from said fluid due to the incident monochromatic radiation and for producing a first output signal having an amplitude indicative of the spectral intensity at said first wavelength and a second output signal having an amplitude indicative of the spectral intensity at said second wavelength;

means connected to receive said radiation generating means trigger signal for generating a series of delayed output pulses whereby each delay pulse is differently spaced in time relative to a radiation pulse by an interval indicative of the range from said radiation generating means to said fluid;

counting means connected to receive said detection means first and second output signals and said delay pulses for similtaneously computing a first count indicative of the spectral intensity at said first wavelength and a second count indicative of the spectral intensity at said second wavelength during the receipt of said delay pulses;

dividing means connected to receive said first and second counts for providing an output signal representative of the quotient value thereof; and function generating means connected to receive said dividing means output signal for transforming the quotient value into an output signal indicative of the temperature in said fluid according to a predetermined function.

9. A device for temperature measurement according to claim 8 wherein said detection means further comprises:

radiation separation means for receiving and separating said Raman scattered radiation from said monochromatic radiation;

filter means for receiving said separated radiation for filtering respectively at said first wavelength indicative of the monomeric Raman spectral region of said fluid and at said second wavelength indicative of the polymeric Raman spectral region of said fluid and for producing outputs representative thereof; and photomultiplier means for receiving said filter means outputs for converting said filtered radiation into respective electrical signals to form said detection means first and second output signals.

10. A device for temperature measurement according to claim 9 wherein said counting means further comprises:

a first encoder connected to receive said detection means first output signal and said delay pulses for producing a first series of pulse trains each having a length proportional to the amplitude of the first output signal during the receipt of individual ones of said delay pulses;

a second encoder connected to receive said detection means second output signal and said delay pulses for producing a second series of pulse trains each having a length proportional to the amplitude of the second output signal during the receipt of individual ones of said delay pulses;

a first counter connected to receive the first series of pulse trains for counting the number of pulses therein and for providing said first count; and a second counter connected to receive the second series of pulse trains for counting the number of pulses therein and for providing said second count.

11. A device for temperature measurement according to claim 10 wherein said radiation generating means further comprises:

a nitrogen laser for producing the trigger signal and said monochromatic radiation at a third wavelength; and tuning means for receiving said monochromatic radiation and converting said radiation from said third wavelength to said predetermined wavelength.

12. A device for temperature measurement according to claim 11 wherein said tuning means comprises a dye cell.

* * * * *